US010073641B2

United States Patent
Bish et al.

(10) Patent No.: US 10,073,641 B2
(45) Date of Patent: *Sep. 11, 2018

(54) CLUSTER FAMILIES FOR CLUSTER SELECTION AND COOPERATIVE REPLICATION

(71) Applicant: INTERNATIONAL BUSINESS MACHINES CORPORATION, Armonk, NY (US)

(72) Inventors: Thomas W. Bish, Tucson, AZ (US); Takeshi Nohta, Yamato (JP); Joseph M. Swingler, Tucson, AZ (US); Rufus-John Y. Twito, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/583,235

(22) Filed: May 1, 2017

(65) Prior Publication Data
US 2017/0235508 A1    Aug. 17, 2017

Related U.S. Application Data

(63) Continuation of application No. 14/970,764, filed on Dec. 16, 2015, now Pat. No. 9,684,472, which is a
(Continued)

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01); *G06F 3/0617* (2013.01); *G06F 3/0665* (2013.01); *G06F 3/0686* (2013.01)

(58) Field of Classification Search
CPC ...... G06F 3/065; G06F 3/0617; G06F 3/0619; G06F 3/067; G06F 3/0686; G06F 11/1464; G06F 11/2082
(Continued)

(56) References Cited

U.S. PATENT DOCUMENTS 6,438,705 B1    8/2002  Chao et al.
6,718,361 B1    4/2004  Basani et al.
(Continued)

FOREIGN PATENT DOCUMENTS

CN    1780420 A      5/2006
CN    101005372 A    7/2007
(Continued)

OTHER PUBLICATIONS

Dabek et al., "Wide Area Cooperative Storage with CFS," 2001 (2 pages).
(Continued)

*Primary Examiner* — Than Vinh Nguyen
(74) *Attorney, Agent, or Firm* — Griffiths & Seaton PLLC

(57) ABSTRACT

Cluster families for cluster selection and cooperative replication are created. The clusters are grouped into family members of a cluster family base on their relationships and roles. Members of the cluster family determine which family member is in the best position to obtain replicated information and become cumulatively consistent within their cluster family. Once the cluster family becomes cumulatively consistent, the data is shared within the cluster family so that all copies within the cluster family are consistent.

18 Claims, 8 Drawing Sheets

Related U.S. Application Data continuation of application No. 14/448,110, filed on Jul. 31, 2014, now Pat. No. 9,250,825, which is a continuation of application No. 12/635,702, filed on Dec. 11, 2009, now Pat. No. 8,812,799.

(58) Field of Classification Search
USPC .................................................. 711/148, 162
See application file for complete search history.

(56) References Cited

U.S. PATENT DOCUMENTS

| | | | |
|---|---|---|---|
| 6,950,833 | B2 | 9/2005 | Costello et al. |
| 7,243,103 | B2 | 7/2007 | Murphy et al. |
| 7,461,130 | B1 | 12/2008 | Abdelaziz et al. |
| 7,774,094 | B2 | 8/2010 | Kishi et al. |
| 8,180,747 | B2 | 5/2012 | Marinkovic et al. |
| 8,812,799 | B2* | 8/2014 | Bish .................... H04L 67/1095 711/141 |
| 9,250,825 | B2* | 2/2016 | Bish .................... H04L 67/1095 |
| 9,684,472 | B2* | 6/2017 | Bish .................... H04L 67/1095 |
| 2003/0221074 | A1 | 11/2003 | Satoyama et al. |
| 2005/0267897 | A1 | 12/2005 | D'Costa et al. |
| 2006/0080362 | A1 | 4/2006 | Wagner et al. |
| 2006/0090045 | A1 | 4/2006 | Bartlett et al. |
| 2006/0149922 | A1 | 7/2006 | Sapir et al. |
| 2007/0294384 | A1 | 12/2007 | Nakajima et al. |
| 2008/0133868 | A1 | 6/2008 | Glew |
| 2008/0250214 | A1 | 10/2008 | Brettell et al. |
| 2009/0030986 | A1 | 1/2009 | Bates |
| 2009/0055401 | A1 | 2/2009 | Mann et al. |
| 2009/0094366 | A1 | 4/2009 | D'Costa et al. |
| 2009/0112244 | A1 | 4/2009 | Freudenthal |
| 2009/0132657 | A1 | 5/2009 | Surtani et al. |
| 2009/0198899 | A1 | 8/2009 | Revanuru |
| 2011/0078494 | A1 | 3/2011 | Maki et al. |
| 2011/0145497 | A1 | 6/2011 | Bish et al. |
| 2012/0290805 | A1 | 11/2012 | Bish et al. |

FOREIGN PATENT DOCUMENTS

| | | |
|---|---|---|
| CN | 101355476 A | 1/2009 |
| JP | 2000322292 A | 11/2000 |
| JP | 2009110319 A | 5/2009 |

OTHER PUBLICATIONS

Zhang et al., "BitVault: A Highly Reliable Distributed Data Retention Platform," vol. 41, Issue 2, Apr. 2007 (1 page).

Haeusser et al., "IBM Total Storage Virtual Tape Server, Planning, Implementing, and Monitoring," Redbooks, Nov. 2005.

Jaho et al., "Cooperative Replication in Content Networks with Nodes under Churn," 10.1.1.147.5542.

Mason, "A Detailed Look at Data Replication Options for Disaster Recovery Planning," Datalink Whitepaper, Jun. 2009 (21 pages).

Fadden, "An Introduction to GPFS Version 3.2.1," IBM Corporation, Nov. 2008 (17 pages).

Anonymous, "Data Stripping," Retrieved from http://en.wikipedia.org/w/index.pfp?title=Data_striping&oldid=320846728, Oct. 18, 2012 (2 pages).

International Search Report and Written Opinion, dated Feb. 24, 2011.

Doulamis et al., "Cluster-Based Proactive Replication of Multimedia Files in Peer to Peer Networks," IEEE, 2007.

IBM, "Peer to Peer Monitoring Controller," www.ip.com, Jan. 2009.

* cited by examiner

CLUSTER FAMILIES FOR CLUSTER SELECTION AND COOPERATIVE REPLICATION

CROSS-REFERENCE TO RELATED APPLICATIONS

This application is a Continuation of U.S. patent application Ser. No. 14/970,764, filed on Dec. 16, 2015, which is a Continuation of U.S. patent application Ser. No. 14/448,110, filed on Jul. 31, 2014, now U.S. Pat. No. 9,250,825, which is a Continuation of U.S. patent application Ser. No. 12/635,702, filed on Dec. 11, 2009, now U.S. Pat. No. 8,812,799.

FIELD OF THE INVENTION

This invention relates to data storage with respect to data storage systems, and more particularly to clusters within storage systems.

DESCRIPTION OF THE RELATED ART

A storage system may include a plurality of tape drives that are used to access a plurality of magnetic tapes using a library manager. The magnetic tapes may be disposed within cartridges. A controller may direct an actuator to transfer a tape cartridge from a storage area to tape drive in order to access data written on the magnetic tape and/or to write data to the magnetic tape.

Storage systems may be located at multiple sites including multiple geographically distinct sites. The storage systems may communicate over one or more networks. Each storage system may include a plurality of clusters. Each cluster may include a plurality of tape drives. Magnetic tapes are mounted to the tape drives in order to read data from and write data to the magnetic tapes.

Each magnetic tape may be organized as one or more logical volumes, referred to herein as volumes. A volume may appear to a host as a distinct storage device. A volume may be logically "mounted" on a virtual tape drive. As used herein, a virtual tape drive is a logical construct that appears to a host as a tape drive.

SUMMARY OF THE INVENTION

Methods, apparatus, and systems are provided to create cluster families, select clusters family members or families, and cooperatively replicate among the family members and different families. For example, clusters are grouped based on their relationships into family members of a cluster family. Members of the cluster family determine which family member is in the best position to obtain outside data objects and become cumulatively consistent with respect to outside data objects within their cluster family. Once the cluster family becomes cumulatively consistent, the data objects are shared within the cluster family so that all clusters within the cluster family have a consistent copy of each outside data object. A first family member to replicate 1/Nth volumes informs the outside cluster that the first family member will maintain the volumes for the cluster family members and relieves the outside cluster from maintaining the volumes in the outside cluster cache.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
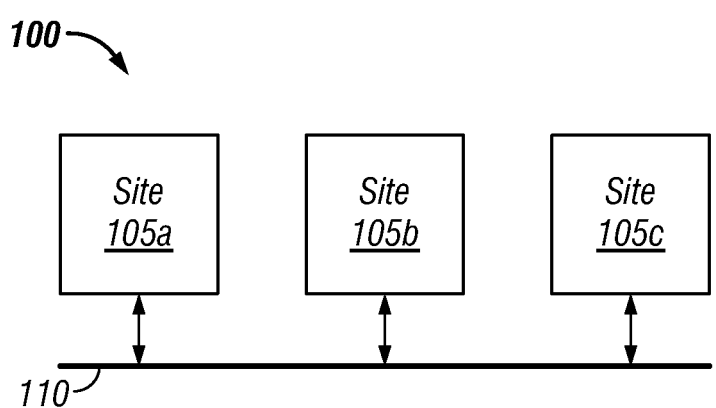
FIG. 1 is a schematic block diagram illustrating an embodiment of distributed sites in accordance with the present invention.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least an embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

This invention is described in embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays (FPGAs), programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within the modules, and may be embodied in any suitable form and organized within any suitable type of data structure. The operational data may be collected as a single data set, or may be distributed over different locations including different storage devices.

Reference throughout this specification to "an embodiment," "an embodiment," or similar language means that a particular feature, structure, or characteristic described in connection with the embodiment is included in at least an embodiment of the present invention. Thus, appearances of the phrases "in an embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating an embodiment of distributed sites 100 in accordance with the present invention. The distributed sites 100 include a plurality of sites 105. Each site 105 communicates with the other sites 105 over a network 110. The network 110 may be the Internet, local area network (LAN), wide area network (WAN), a dedicated network, a combination of networks, and the like.

Each site 105 may include one or more storage systems as will be described hereafter. In addition, each site 105 may include bridges, routers, and the like that connect the storage systems to the network 110.

Figure 2A:
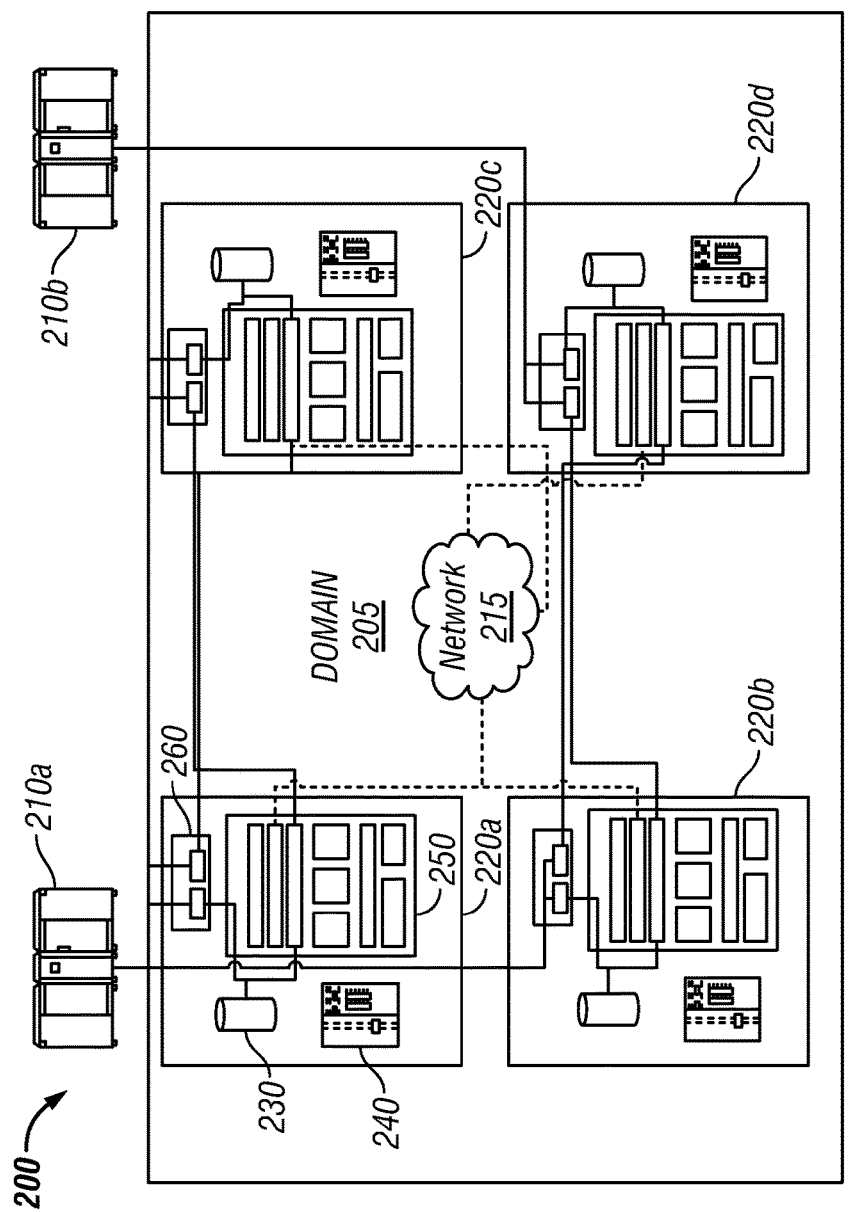
FIGS. 2A and 2B are schematic block diagrams illustrating an embodiment of a storage system in accordance with the present invention.
Figure 2B:
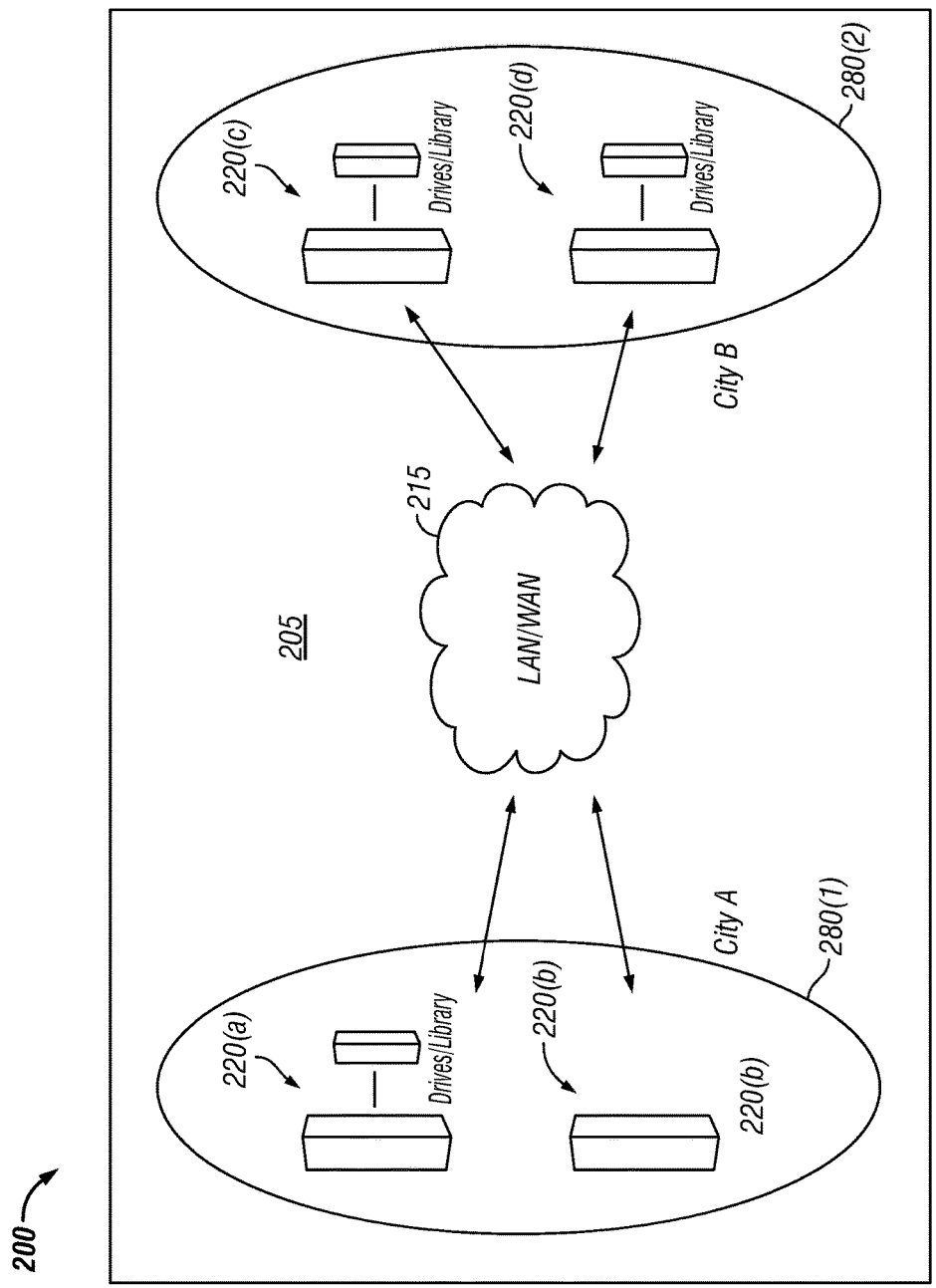

FIGS. 2A and 2B are schematic block diagrams illustrating an embodiment of a storage system 200 in accordance with the present invention. One or more storage systems 200 may be embodied in each site 105 of FIG. 1.

The storage systems 200 may store data in different physical media, including, but not limited to, storage cartridges, disk drives, solid state disks (SSD), disks direct access storage devices (DASD), magnetic tape drives, libraries, and disk drive arrays, such as RAID (redundant array of independent disks), or JBOD (just a bunch of disks), An example of a storage cartridge is a magnetic tape cartridge, which includes a rewritable magnetic tape wound on a hub of reel, and a cartridge memory. One example of a magnetic tape cartridge includes a cartridge based on LTO (Linear Tape Open) technology.

The storage systems 200 may store data in different forms, such as logical or virtual data. Herein, data may be organized in any of various forms, called "volumes" or "objects", the terms chosen without reference to any particular size or arrangement of data.

As illustrated in FIGS. 2A and 2B, the storage system 200 provides storage for a plurality of host systems 210. For example, the storage system 200 includes a plurality of hosts 210, a plurality of clusters 220, and a network 215. Although for simplicity, two (2) hosts 210a, 210b, four (4) clusters 220a, 220b, 220c, 220d and one (1) network 215 are shown in FIG. 2A, any number of hosts 210, clusters 220, and networks 215 may be employed. Accordingly, any number of clusters 220 may be included in storage system 200.

As illustrated in FIG. 2A, the storage system 200 may employ four (4) clusters 220a, 220b, 220c, 220d connected by a network 215 with each cluster 220 including a virtualization node ("VN") 260 and a storage device 230 for emulating a tape drive or tape library to hosts 210a, 210b. In an embodiment, clusters 220a, 220b, 220c, 220d are virtual tape server cluster.

Each cluster 220 includes a hierarchical storage node ("HSN") 250 for locally moving and/or transferring data between storage device 230 and library 240. In an embodiment, storage system 200 includes a disk storage 230 and a tape library 240. In an embodiment, the library 240 is an automated tape library ("ATL"). The HSN 250 may operate to remotely transfer data between the local disk storage 230 and the remote disk storage 230. The disk storage 230 may include one or more disk drives arranged as a RAID, JBOD, SSD or any combination thereof, for example.

Figure 3:
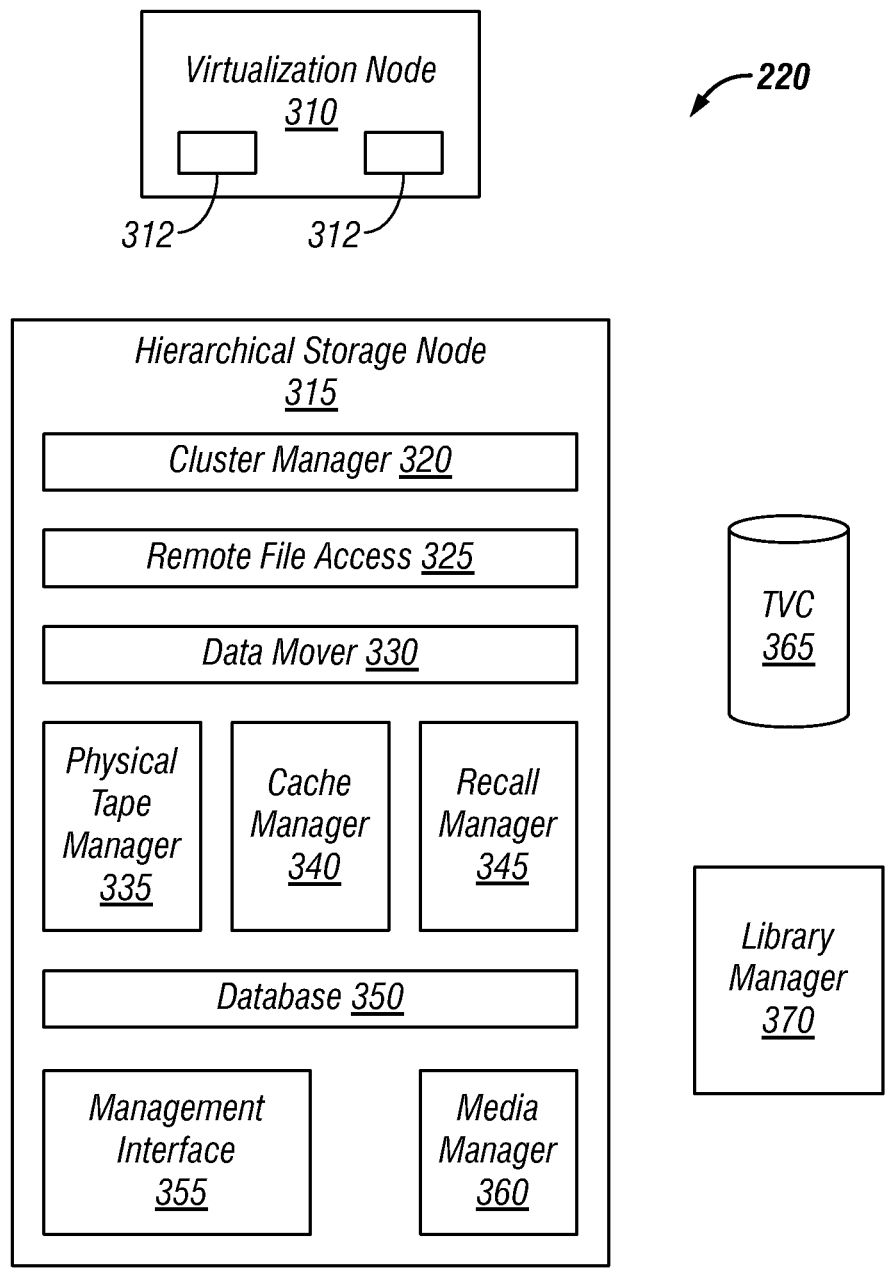
FIG. 3 is a schematic block diagram illustrating an embodiment of a cluster of the present invention.

Each cluster 220 includes a library manager 370 as illustrated in FIG. 3 with magnetic tapes as will be described hereafter. The hosts 210 may initiate and run tasks or jobs, such as tape jobs, in which data is read from and written to the magnetic tapes in the cluster families 280 and/or family members 220. The hosts 210 may be mainframe computers, servers, or the like. The hosts 210 may have the ability to run or host multiple operating systems. For example, the hosts 210 may run or may host multiple operating systems such Linux, Java, Windows or the like. Each of the hosts 210 of the storage system 200 may operate as the single mainframe computer, one or more servers, or as number of virtual machines. The hosts 210 may provide three levels of virtualization through logical partitions (LPARs) via the PR/SM facility, through virtual machines via the z/VM operating system, and through operating systems, notably z/OS with key-protected address spaces and goal-oriented workload scheduling.

The hosts 210 may communicate with the cluster 220 over the network 215 to access a plurality of magnetic tape drives, disk drives, and other storage devices through the cluster family members 220 as will be described hereafter. For example, a first host 210a may communicate over the network 215 to access a storage device and a magnetic tape through a first cluster 220a.

Each cluster 220 may include a hierarchical storage controller, such as hierarchical storage node 315, as illustrated in FIG. 3. The cluster 220 may provide a single point management for data to be read and stored, aggregating storage pools in which storage can easily be allocated to different hosts 210, scaling the storage system 200 by adding storage or storage control nodes, and a platform for implementing advanced functions such as fast-write cache, point-in-time copy, transparent data migration, and remote copy.

The clusters 220 may follow an "in-band" approach. The in-band approach may cause all input/output (I/O) requests and all management and configuration requests to be processed through a cluster family member 220.

Each of the clusters 220 may be connected between themselves and with the hosts 210 over the network 215 to access data written on the magnetic tape and/or to write data to the magnetic tape. The plurality of clusters 220 may form a domain 205 of the storage system 200. The domain 205 may represent a multi-cluster or grid configuration. The domain 205 may include two or more clusters 220.

The network 215 of the storage system 200 may be storage area network (SAN), a token ring network, local area network (LAN), wide area network (WAN), the Internet, a dedicated network, a combination of networks, and the like. The SAN may consist of a "fabric" through which the hosts 210 may communicate with the clusters 220 over the network 215. The fabric may include a Fibre Channel network, an Ethernet network, or the like. All elements may not share the same fabric for communication. The first host 210*a* may communicate with the first cluster 220*a* over one fabric. In addition, the first host 210*a* may communicate with a third cluster 220*c* over another fabric.

Each storage system 200 may include a cluster family 280. The cluster family 280 may include a plurality of cluster family members 220 that are arranged, configured, organized, and/or grouped into the cluster family 280 For example, as illustrated in FIG. 2B, storage system 200 includes cluster family 280(1) and cluster family 280(2). Cluster family 280(1) includes a plurality of cluster 220(*a*), 220(*b*) grouped into family members of cluster family 280(1). Cluster family 280(2) includes a plurality of cluster family members 220(*b*), 220(*c*) grouped into family members of cluster family 280(2). Cluster family 280(1) and cluster family 280(2) communicate with each via network, such as network 110, 215. Each cluster family 280 may be given or assigned a name. For example, cluster family 280(1) may be named as City A and cluster family 280(2) may be named as City B.

Although, for simplicity, FIG. 2B illustrates a storage system 200 having two cluster families 280. Any number of storage systems 200, cluster families 280, and cluster family members 220 may be employed.

An example of a storage system 200 is the IBM® TS7700 Virtual Tape Server.

FIG. 3 is a schematic block diagram illustrating an embodiment of a cluster 220 of the present invention. The cluster 220 may represent a cluster family member 220 of cluster family 280 of FIGS. 2A and 2B, for example. The description of cluster 220 refers to elements of FIGS. 1-2, like numbers referring to like elements. The cluster 220 may include a virtualization node 310, a hierarchical storage node 315, a volume cache 365, and a library manager 370.

The storage device 230 may include one or more disk drives, for example, arranged as a redundant array of independent disks (RAID) or just a bunch of disks (JBOD), or solid state disk (SSD), etc. The storage device 230 may include the volume cache 365. The volume cache 365 may serve as a virtual volume cache and/or tape volume cache (TVC).

For example, storage device 230 includes a virtual volume cache 365. The virtual volume cache 365 may serve as a TVC, wherein the TVC includes a rapidly accessible storage device such as a hard disk drive. In an embodiment, cluster 220 operates to cache data to the TVC 365.

The TVC 365 may cache data that is read from the logical volume and/or cache data that is to be written to the logical volume. A host 210 may make repeated writes to a logical volume. The TVC 365 may store the written data on a hard disk drive 230 without writing the data to the logical volume's magnetic tape. At a later time, the TVC 365 may write the cached data to the magnetic tape within tape library 240. Accordingly, operations such as read operations and write operations for a virtual tape drive mounting a logical volume may be routed through the TVC 365.

A host 210 may initiate and run task and/or jobs on the cluster 220. For example, a first host 210*a* access may result in an actuator of the library manager 370 being controlled by a physical tape manager 335 to transfer a tape cartridge from a storage area to a tape drive in order to access data written on the magnetic tape and/or to write data to the magnetic tape and/or TVC 365.

The virtualization node 310 may be an independent processor-based server with multiple connections to the network 215. The virtualization node 310 may include either a battery backup unit (BBU) and/or may have access to an uninterruptible power supply (UPS). The virtualization node 310 may contain a watchdog timer. The watchdog timer may ensure that a failing virtualization node 310 that is not able and/or takes a long time to recover may be restarted.

The virtualization node 310 may include one or more tape daemon 312. The tape daemon 312 may emulate a tape drive of the cluster 220 to the host 210 as a virtual tape drive. The tape daemon 312 may operate on a file that is either on the TVC 365 and/or may operate on a file in a remote TVC 365 of another cluster 220 through a remote file access 325.

The hierarchical storage node 315 may include a cluster manager 320, the remote file access 325, a data mover 330, the physical tape manager 335, a cache manager 340, a recall manager 345, a database 350, a management interface 355, and a media manager 360. The cluster manager 320 may coordinate operations between the plurality of clusters 220 in a multi-cluster or grid topology.

The cluster manager 320 may use tokens to determine which cluster 220 has a current copy of the data. The tokens may be stored in the database 350. The cluster manager 320 may also coordinate copying data between the clusters 220. The cluster manager 320 may include one or more processors configured to execute computer readable programs as is well known to those of skill in the art.

The remote file access 325 may be a server, one or more processors, or the like. The remote file access 325 may provide a link to the TVC 365 for access by any remote cluster 220. The cluster manager 320 may include a computer readable program.

The data mover 330 may control the actual data transfer operations for copies performed between clusters 220 and also may transfer of data between physical tape media and the TVC 365. The data mover 330 may include a computer readable program.

The physical tape manager 335 may control the physical tapes in the cluster 220. The physical tape manager 335 may manage the physical tapes in multiple pools, reclamation, borrowing and returning of volumes from and to a common scratch pool, and transfer tapes between pools. The physical tape manager 335 may include a computer readable program.

The cache manager 340 may control the copying of data from the TVC 365 to the physical tapes and the subsequent removal of a redundant copy of data from the TVC 365. The cache manager 340 may also provide the control signals to balance data flow between the different components and the TVC 365. The cache manager 340 may include a computer readable program.

The recall manager 345 may queue and control recall of data into the TVC 365 from physical media for either a virtual tape drive or copies requested by the cluster manager 320. The recall manager 345 may include a computer readable program.

The database 350 may be a structured collection of records that may be stored on a hard disk drive. The records may include the locations of data on magnetic tape. The host 210 may write the data to the magnetic tape of the cluster 220 and/or may access the data from the magnetic tape using database addresses to provide the data to a user.

The management interface 355 may provide information about the cluster 220 to the user. Also, the management interface 355 may allow the user to control and configure the cluster 220. The management interface 355 may include a computer cathode ray tube (CRT), a liquid crystal display (LCD) screen, a keyboard, or the like, or exist as a web based interface.

The media manager 360 may manage the physical handling of the magnetic tapes of the cluster 220. Also, the media manager 360 may manage error recovery of the magnetic tapes of the cluster 220. The media manager 360 may diagnose errors and may determine if the errors are caused by the physical tape drives or by the physical tape media. Further, the media manager 360 may take appropriate action for error recovery.

The library manager 370 may include plurality of physical tape drives, a robotic accessor, and a plurality of physical tape media. The robotic accessor of the library manager 370 may transfer the magnetic tape to a tape drive assigned to the TVC 365. A virtual tape drive may be a logical construct that appears to the host 210 as a physical tape drive. The data may be read from or written to the magnetic tape of the tape drive through a read/write channel as is well known to those skilled in the art.

Each tape drive of the plurality of clusters 220 may employ one or more magnetic tapes to store the data. The magnetic tape may act as a storage media of the data in the storage system 200. The cluster 220 may employ any number of tape drives and magnetic tapes. For example, the storage system 200 may employ two (2) tape drives and two hundred fifty-six (256) virtual drives.

The TVC 365 may contain data from tape volumes being operated on and stores additional volume data for rapid access. Operations such as read operations and write operations for a virtual tape drive mounting a volume may be routed through the TVC 365. Thus selecting a cluster 220 may select the cluster's TVC 365. All the magnetic tapes of the tape drive may be organized as one or more logical volumes or volumes. The volumes in the TVC 365 may be managed using a first in first out (FIFO) and/or a least recently used (LRU) algorithm.

The TVC 365 may be a rapidly accessible storage device. For example, the TVC 365 may be a hard disk drive with a storage capacity of five thousand four hundred gigabytes (5400 GB) or the like. In the storage system 200, the tape drive may cache data to the TVC 365 that is to be read from the logical volume and/or may cache data that is to be written to the logical volume. For example, the host 210 may make repeated writes to a virtual tape drive. The TVC 365 may store the written data on the hard disk drive without writing the data to the virtual magnetic tape. At a later time, the cache manager 340 may write the cached data to the magnetic tape of the cluster 220.

The virtualization node 310 that accessed a volume may be referred to as a mount-point. Choosing a remote cluster TVC 365 that was used for a recent mount-point for a logical volume may improve access to the volume. The high-availability, fast-write storage of the TVC 365 allows the hosts 210 to write data to the TVC 365 without having to wait for the data to be written to a physical disk.

In an embodiment, each site 105 comprises a storage system 200. Each storage system 200 comprises two or more cluster family members 220 grouped together to create a cluster family 280. For example, cluster family 280(1) comprises a group of cluster family members 220(a) and 220(b) and cluster family 280(2) comprising a group of cluster family members 220(c) and 220(d). Cluster family 280(1) may be used for production purposes and cluster family 280(2) may be used for DR or archival purposes, for example. Accordingly, cluster families 280 may perform different roles with respect to other cluster families 280. In addition, cluster family members 220 of a cluster family 280 may perform different roles with respect to each other within the cluster family 280. Accordingly, cluster family members 220 of a cluster family 280 may perform different roles with respect to non-family members.

In an embodiment, cluster families 280 may be configured at global distances, metro distances, or combinations thereof. Similarly, cluster family members 220 may be configured at global distances, metro distances, or combinations thereof. In addition, the cluster family members 220 may have different distant ratings from each other in a cluster family 280. Similarly, cluster families 280 may have different distant ratings between each other. While distant ratings may be used as a factor to define roles and relationships between cluster families 280 and cluster family members 220, this is but just a factor in bringing relationship awareness between the cluster family members 220 and cluster families 280. Thus, arranging or grouping clusters 220 into cluster family members of a cluster family 280 is not limited to distances.

Additionally, because each storage system 200 includes a cluster family 280 created by grouping two or more clusters 220 into family members, each storage system 200 or combination of storage systems 200 may represent a multi-cluster configuration or grid.

Furthermore, the clusters 220 of storage system 200 may form distributed store configuration. For example, a second cluster 220(b) may create a secondary instance of a volume. The secondary instance may be synchronized with the primary copy on a first cluster 220(a), wherein the secondary copy is updated any time the primary copy is updated. The secondary instance may be stored in another cluster family 280 located at a remote site 105 in order to ensure availability of data in case the primary instance becomes unavailable. Future mount-point accesses may choose the secondary copy as the primary copy. Transparent data migration may be used when adding, removing, and/or rebalancing data to magnetic tape.

Although implementations of the present invention are discussed in reference to FIGS. 1-2, this is only for illustration purposes. One skilled in the art will appreciate that the present invention is not limited to any specific grid configuration and may be implemented in any multi-cluster or grid configuration. For example, one or more clusters 220 from site 105(a) may be grouped with one or more clusters 220 from a different site 105, such as site 105(b), to create a first cluster family 280. Likewise, one or more clusters 220 from site 105(c) and site 105(a) may be grouped in family members to create a second cluster family 280. Hence, any combination of clusters 220 may be grouped into family members to create a cluster family 280.

Figure 4:
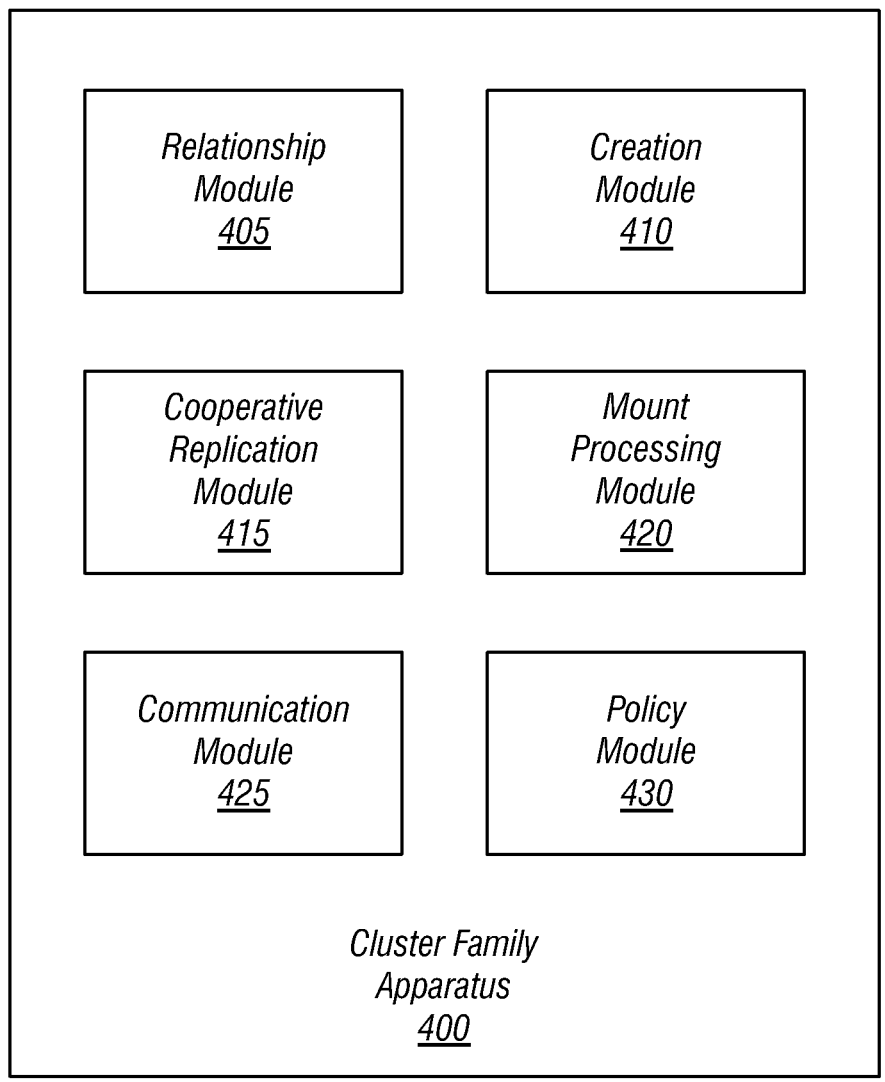
FIG. 4 is a schematic block diagram illustrating an embodiment of a cluster family apparatus of the present invention.

FIG. 4 is a schematic block diagram illustrating an embodiment of a cluster family apparatus 400 of the present invention. The apparatus 400 may be embodied in a host 210 and/or a cluster 220. In an embodiment, the apparatus 400 is embodied in the cluster manager 320. The description of the apparatus 400 refers to elements of FIGS. 1-3, like numbers referring to like elements. The apparatus 400 may include a relationship module 405, a creation module 410, a cooperative replication module 415, a mount processing module 420, a communication module 425, and a policy module 430 or any combination thereof.

The relationship module 405 comprises a computer readable program executing on a processor such as a processor of the cluster manager 320. In addition, the cluster relationship module 405 includes factors defining roles and relationship between cluster families 280 and family members 220. For example, factors relating to which family members belong to which families, the distance ratings between neighboring families and/or family members, and which family members are used for production purposes and which ones are used for DR (disaster recover) and/or archiving purposes.

The cluster family members 220 are in communication over a network such as the network 110 and/or the network 215. Each cluster family member 220 may comprise a library manager 370 with at least one tape drive configured to access volumes stored on magnetic tape and at least one TVC 365.

The creation module 410 comprises a computer readable program executing on the processor such as the processor of the cluster manager 320. The creation module 410 selects and arranges clusters 220 into family members of a cluster family 280 by grouping clusters 220 together to operate with a common set of guidelines, rules, and/or purpose.

The creation module 410 groups clusters 220 into a cluster family 280 to allow the family members 220 obey a common set of rules or guidelines. This allows groups of clusters, such as families 280(1), 280(2), for example, to work together to accomplish a particular task more efficiently or to allow different groups of clusters 220 an/or families 280 to have different purposes within a grid.

The creation module 410 may be utilized to allow customizable behavior of family members 220 within a family 280 through configuration properties. For example, referring to FIG. 2B, a group of cluster family members 220(a), 220(b) may be allowed to act as production family 280(1) obeying a set of rules beneficial to production workloads. Another group of cluster family members 220(c), 220(d) in the domain 205 may be allowed to act as an archival or disaster recovery family 280(2) with rules making family members 220(c), 220(d) operate more effectively in replicating data from a production family 280(1).

In addition, the creation module 410 manages the relationships of family members 220 of a family 280 and the relationships between different cluster families 280. For example, creation module 410 may manage cluster family members 220 based on their relationships and roles. In an embodiment, the relationships module 405 may provide this information to creation module 410. Based on the family members and neighboring families' relationships and/or roles, the clusters family members 220 will negotiate between each other to determine which family member 220 is in the best position to obtain outside data from a plurality of clusters outside of the family 280. The creation module 410 may also use this information to favor members 220 of a family 280 as TVC clusters or allow access restrictions or other special case behavior on a family 280 as opposed to just a cluster or grid-wide.

Creation module 410 may utilize the management interface 355 to display a page where a user (e.g., customer) may create a cluster family with a character name, such as an eight character name. The user may then add one or more clusters to a family using the creation module 410. Creation module 410 may store this information within a cluster persistent vital product data so that all clusters in a multi-cluster or grid configuration are aware of their cluster's role and the family it resides in. The creation module 410 may determine that a cluster being select for a family is already selected for another family. To avoid having any one cluster existing in two families at the same time, the creation module 410 may notify the user that the cluster being select already exist in another family member. In addition, the creation module 410 may employ a set of rules to prevent the selection of one cluster into two families at the same time.

The policy module 430 comprises a computer readable program executing on the processor such as the processor of the cluster manager 320. In an embodiment, the policy module 430 may include certain policies relating to which cluster family members 220 should be used for production and which family members should be used for DR/archival purposes. These policies may include sets of rules governing the replication of data. A user may enter the policies for managing multiple cluster families 280 and family members 220 via management interface 355.

Referring to FIGS. 2A and 2B, cluster family creation module 410 may be used to create a cluster family 280(1) named "City A" and to create another cluster family 280(2) named "City B". Cluster family 280(1) may include a group of cluster family members 220(a), 220(b) and cluster family 280(2) may include a group of cluster family members 220(c), 220(d). In addition, the creation module 410 may be used to add or remove family members 220 to or from a cluster family 280 and to regroup cluster family members into different cluster families 280.

Because the creation module 410 sets up and arranges clusters into family groups based on their relationships and/or roles to each other during the creation of a family, all clusters in a grid or multi-cluster configuration are aware of each others roles and the families they reside in. Hence, the creation module 410 may alert or notify a user via management interface 355 that the cluster 220(d) being added to the family 280(1), for example, is currently a family member of another family 280(2). The user may then deselect 220(d) from family 280(2) and add or reselect 220(d) to family 280(1). Accordingly, the creation module 410 allows all clusters 220 in a domain 205 (e.g., a grid) to be aware of their own role and relationship to their family they reside in, to other family members, and to non-family members residing in other families.

In an embodiment, the creation module 410 may assign a name to a cluster family. For example, during configuration a user may assign a name to a cluster family using the management interface 355.

The cooperative replication module 415 comprises a computer readable program executing on the processor such as the processor of the cluster manager 320. In addition, the cooperative replication module 415 enhances existing copy management to enable groups of clusters 220 belonging to a cluster family 280 to work together to be more efficient in achieving consistency for the family 280 as well as among individual clusters 220 within the family 280 (e.g., family members 220).

The cooperative replication module 415 allows two or more cluster family members 220 within a family 280, such as a DR or archival family, to share inbound replication workload. Accordingly, a family 280 of DR/Archival cluster family members 220 utilizing cooperative replication module 415 benefits from improved TVC selection when choosing a source cluster for replication.

The cooperative replication module 415 allows a cluster family member to share a copy workload among other cluster family members belonging to the same family. For example, in an embodiment, a domain 205 includes Y clusters 220, where Y represents the number of clusters 220 included in the domain 205. The clusters are grouped into cluster families 280 having two or more cluster family members 220. Hence, the domain 205 is made up of Y clusters 220 in which some of the clusters 220 are grouped into N cluster family members of a cluster family 280.

For example, referring to FIG. 2B, there are four clusters 220(a), 220(b), 220(c), and 220(d) in domain 205 so Y represents four clusters (Y=4). Two clusters 220(a) and 220(b) are grouped into N cluster family members of a first cluster family 280(1) and two clusters 220(c) and 220(d) are grouped into N cluster family members of a second cluster family 280(2). In this grid configuration, domain 205 is made up of Y(4) clusters, in which a subset of N clusters are grouped into family members of cluster families 280. Accordingly, N=number of cluster family members in a family.

The cooperative replication module 415 cooperatively replicates a family group of clusters by serializing the replication of any one volume when bringing it into the family for the first time. For example, the cooperative replication module 415 directs each cluster member 220(c) and 220(d) in the family 280(2) to replicate 1/Nth of outside volumes where N is the number of clusters in the family requiring a copy. Once all outside volumes are replicated into the family 280(2) and the family 280(2) is cumulatively consistent, the inconsistent clusters within the same family 280(2) then share among each the outside data.

As an example, it is possible from a microcode level that each cluster 220 works independently of each other because the clusters 220 are unaware of there relationships and roles to each other. For example, if we assume that cluster 220(a) includes 20 volumes that need to be replicated to clusters 220(c) and 220(d). Because clusters 220(c) and 220(d) are working independently of each other, each cluster 220(c), 220(d) may pull 20 copies of the original data across network 215.

Now referring to FIGS. 2A and 2B, in an embodiment, for example, there are four clusters in which two clusters 220(a), 220(b) are grouped into family 280(1) and two clusters 220(c), 220(d) are grouped into family 280(2) via creation module 410. All family members 220 are aware of each other and the families 280 they belong to and are aware of all the volumes needing to be replicated into adjacent clusters within families.

For example, cluster family member 220(c) and 220(d) are aware of each other and that there are 20 volumes from a non-family member 220(a) within a different cluster family 280(1) that needs to be replicated into their family 280(2). Utilizing the cooperative replication module 415, family member 220(c) pulls 10 unique volumes and family member 220(d) pulls the other 10 unique volumes. That is, each cluster family member 220(c), 220(d) pulls 1/Nth of the volumes, where N=number of cluster family members in a family. Because in this example there are two cluster family members 220(c), 220(d) belonging to family cluster 280(2), each family member pulls ½ of the volumes (e.g., each pulls 10 unique volumes) to get a total of 20 volumes. The cluster family members 220(c), 220(d) then share the 10 unique volumes with each other.

By cooperatively replicating via the cooperative replication module 415, the cluster family 280(2) or DR location may become cumulatively consistent N time faster because any one volume was only pulled across the distant link 110/215 once versus N times. The cluster family members 220 may then become consistent among each other for availability much faster due to their relative distance between them. Accordingly, the overall time to become both DR consistent and highly available (HA) consistent may be greatly enhanced over each cluster 220 independently sourcing from the same remote production clusters 220.

Accordingly, it is possible to optimize copy throughput and improve the overall time to reach volume consistency within the cluster family 280. For example, in a limited bandwidth system or a grid with multiple archive sites, the cooperative replication module 415 allows each family member 220 in a family 280 to participate in the replication process for all inbound copies without duplicating any effort. Once a group of clusters (family members) 220 within a family 280 reach an aggregate consistent state, the consistent copies within individual clusters 220 in the family 280 are shared among peer clusters within the same family.

In addition, the cooperative replication module 415 handles persistent replication source awareness by deferring replication. For example, a cluster member 220 that has a consistent source may be instructed to maintain that source volume in cache in order to make it readily available to other family members 220 for peer replication. The cluster with the consistent source inherits the role of the original mount-source cluster or the cluster containing the host created/modified original copy. Once one cluster in a family replicates one of its 1/Nth volumes, the cooperative replication module 415 first informs the original mount-source cluster that all other clusters in its family, including itself, are accounted for and that the production cluster can relieve itself of the role on behalf of the clusters in the targeted family. This frees the production cluster to stage the volume out to back end tape (assuming there is no other families or production clusters needing copies), thus providing more cache availability. Second, the DR family cluster which initiated the replication for the volume inherits the role and remembers which clusters within its family still need a copy. Through this inheritance, the volume may be favored in cache until all its peer family clusters have completed a copy.

In an embodiment, the cooperative replication module 415 may employ cascading copy required flags. For example, cooperative replication module 415 moves the ownership of the copy required flag from one cluster family to another as a cluster family becomes consistent. By cascading the copy required flags, the cooperative replication module 415 may allow the benefits of the flags to be shifted from one family to another thus relieving the original TVC of its involvement. By inheriting the copy required flags from the TVC, for example, once a family member attained a copy it may allow the TVC cluster to migrate the volume and make room in cache for other new workload.

An example may be a domain consisting of a production or default family in conjunction with a DR/archival family. The TVC cluster may be a member of the production or default family and may begin managing the copy required flags. Once a member of the DR/archival family obtains a copy from the TVC cluster the DR/archival family may notify the TVC cluster to clear all copy required flags pertaining to members of the DR/archival family. In conjunction with this, the DR/archival family may inherit the responsibility of managing those copy required flags for its family members.

For example, domain 205 may include a first family cluster 280(1) comprising cluster family members 220(a), 220(b), 220(c), a second family cluster 280(2) comprising cluster family members 220(d), 220(e), 220(f), and a third family cluster 280(3) comprising cluster family members 220(g), 220(h), 220(i). Each family 280 includes three cluster family members 220 and each family member represents a bit. There is a total of 9 bits in the bit-set because there are three families with each family having three family members (3 bits). Family cluster 280(1) includes the original data object needing to be replicated into family clusters 280(2), 280(3), for example.

It is possible that cluster 220(a) may hold the volume in cache until all nine clusters 220 have pulled a copy across the network 110 or 215. For example, cluster 220(a) may include a 9 bit-set and when each cluster 220 pulls a copy, cluster 220(a) may clear a bit in its mask. Because cluster 220(a) is holding a copy in its cache for all nine clusters 220, cluster 220(a) may not be able to make room for additional workload.

By allowing each cluster family 280 to inherit the responsibility of managing those copy required flags for its family members, cluster 220(a) may clear the remaining 6 bits for those cluster family 280(2), 280(3), and only keep the copy in its cache for its own two family members 220(b), 220(c) residing in family 280(1). Once its own family members 220(b) and 220(c) have a copy, cluster 220(a) may then clear its mask to make room for more workload.

In this example, cluster 220(d) of family 280(2) pulls a copy across network 215 and informs cluster 220(a) of family cluster 280(1) that it no longer needs to hold the copy in cache for family 280(2) because 220(d) will keep a copy in its cache until its family members 220(e), 220(f) receive a copy. This relieves cluster 220(a) from holding the copy in cache for all the family members of cluster family 280(2). Similarly, a family member 220(g) belonging to family 280(3) instructs cluster 220(a) that it will keep a copy in its cache for its family members 220(h), 220(i). Thus, cluster 220(a) is relieved of holding a copy in its cache for all the family members belonging to 280(3).

In addition, the cooperative replication module 415 may increase performances in low bandwidth environments by utilizing more links within the domain to perform copies instead of primarily relying on copies from the TVC and the overall time for clusters within a family to become consistent improves. For example, families 280 employing the cooperative replication module 415 collaborate in order to achieve consistency across the family. Upon reaching family-wide consistency, the family members 220 then work together to share data amongst family members to bring each individual member up to the family's consistency level.

The mount processing module 420 comprises a computer readable program executing on the processor such as the processor of the cluster manager 320. The mount processing module 420 favors and selects cluster family member in its own family over clusters outside its family when a mount occurs to a logical volume with a cluster. For example, a mount to a production cluster may favor another production cluster in the same family 280(1) over a remote cluster being used primarily for DR or electronic vaulting. The mount processing module 420 may be employed to favor availability over disaster recoverability when production data needs to remain local and replicate quickly for high availability and thus, select family members within the production family over the DR family.

The mount processing module 420 may improve control and performance by favoring cluster family members when remote mounts are required. Families and/or family members may be configured (e.g., using the creation module 410) to prefer certain clusters over other clusters when choosing a remote TVC. This may be beneficial in distinguishing a set of production clusters from non-production clusters. Preferring the family members within the same production family may keep TVC selection within the production clusters rather than potentially choosing distant remote clusters intended for DR or archival purposes.

In addition, because the cluster family member 220 within a cluster family 280 is the target of a mount and is favored within the same cluster family 280, the TVC selection processing may be improved.

In an embodiment, a storage system 200 may include a plurality of clusters in which a subset of two or more clusters 220 are grouped into a first cluster family 280 and a subset of two or more clusters 220 are grouped into a second cluster family 280. The grouping of the family group may be based on the family members' roles, relationship, and/or distances to each other and/or to other non-family member clusters. Each cluster family member of the cluster family 280 is aware of their relationship to each other. This relationship awareness among family members allows the group to work together effective to cumulatively replicate data into the group and then replicate amongst each other.

Site 105 may include a cluster family 280 or a combination of cluster families 280. For example, site 105(a) may include a first cluster family 280 and a second cluster family 280. The first cluster family 280 may include production clusters 220(a), 220(b) and the second cluster family 280 may include DR clusters 220(c), 220(d). In addition, clusters 220 may be selected from a combination of sites 105 to create a cluster family 280. For example, a cluster family 280 may be created from selecting clusters 220 at multiple sites 105, such as 105(a) and 105(b), wherein clusters 220(a), 220(b) at site 105(a) are used for production purposes and clusters 220(c), 220(d) at site 105(b) are used for DR and/or achieving purposes.

In an embodiment, clusters 220(c), 220(d) are used for archiving data. In an embodiment, clusters 220(c), 220(d) are used for DR. In another embodiment, one cluster, such as cluster 220(c), is used for DR and the other cluster, such as cluster 22(d), is used for archiving.

The schematic flow chart diagrams that follow are generally set forth as logical flow chart diagrams. As such, the depicted order and labeled steps are indicative of an embodiment of the presented method. Other steps and methods may be conceived that are equivalent in function, logic, or effect to one or more steps, or portions thereof, of the illustrated method. Additionally, the format and the symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method.

Additionally, the order in which a particular method occurs may or may not strictly adhere to the order of the corresponding steps shown.

Figure 5:
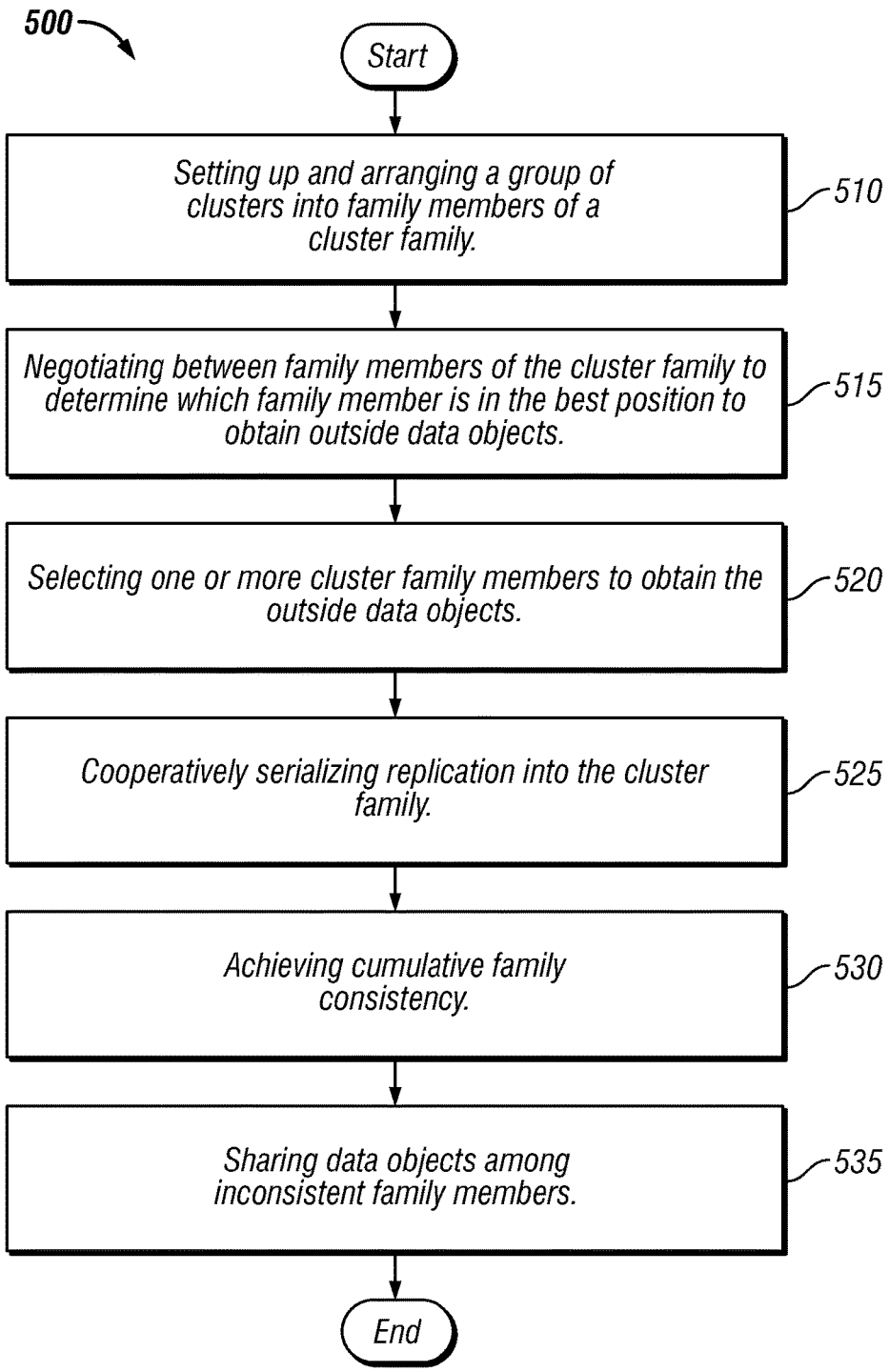
FIG. 5 is a schematic flow chart diagram illustrating an embodiment of a cluster family selection and cooperative replication method of the present invention.

FIG. 5 is a schematic flow chart diagram illustrating an embodiment of a cluster family selection and cooperative replication method of the present invention. The method 500 substantially includes the steps to carry out the functions presented above with respect to the operation of the described apparatus and system of FIGS. 1-4. In an embodiment, the method is implemented with a computer program product comprising a computer readable medium having a computer readable program. The computer readable program may be integrated into a computing system, such as the cluster manager 320 and/or hosts 210, wherein the program in combination with the computing system is capable of performing the method 500.

The method 500 starts and in step 510, a group of clusters are arranged into family members of a cluster family. For example, clusters are grouped base on their relationships to each other and other clusters in a domain. Cluster families may be created based on a variety of factors and/or functions including roles (e.g., production source, DR, archiving, etc), scope, distances (e.g., distance ratings between families), and the like. In addition, a user may assign a character name to create a cluster family. For example, as illustrated in FIG. 2B, a cluster family may be created using a character name "City A" and another family may be created using a character name "City B".

In an embodiment, the creation module 410 is used to create a cluster family, wherein a user may create a cluster family during configuration using a management interface 355 to create a cluster family name, add one or more clusters to a family, assign a role and/or a distance rating between neighboring families, and educate the clusters using configuration properties. These persistent settings may be used by the creation module 410, for example, to bring relationship awareness to one or more clusters or family members as well as relative properties between families, such as distance.

In an embodiment, the relationship module 405 maintains these persistent settings for the cluster families and family members.

Additionally, an autonomic functionality may be employed to detect the roles and relationships between clusters. The autonomic functionally mat be executed in creation module 410, for example.

In step 515, family members negotiate between each other to determine which family member of the family which family member is in the best position to obtain outside data objects. For example, as illustrated in FIG. 2B, cluster family 280(1) includes two or more family members 220(a), 220(b), which may be configured at metro distances and used for production purposes. Cluster family 280(2) includes two or more cluster family members 220(c), 220 (d), which may be configured at global distances with respect to family 280(1) and used for DR purposes. Cluster family 280(1) may communicate with cluster family 280(2) via network 110, 215 that data objects are ready to be copied. Because clusters members of each family as well as the families themselves are aware of each others roles and relationships to each other, family members 220(c), 220(d) may negotiate between each other to determine which family member of the family 280(2) is in the best position to obtain a copy of the outside data objects.

In an embodiment, for example, cluster family members 220 belonging to a cluster family 280 work in FIFO order using a common copy work queue. Before working on a copy, each cluster family member 220 first makes sure no other cluster family member in the cluster family 280 is already copying or has already copied. If not, one or more cluster family members 220 may perform the copy. If copying is occurring by another family member or has already occurred by another family member, one or more cluster family members may move the copy into a deferred queue. Sometime later after all active production content is copied into the cluster family 280, the family members start working on the deferred queue which is content they should be sharing among each other. If the peer family member that originally got the copy isn't present, it may still get a copy from an outside cluster or another family member.

In step 520, one or more cluster family member obtains and replicates the information or source volume. For example, one or more cluster family members 220 belonging to a cluster family 280 is selected to pull the data or source volume across the remote network 110,215 copy/replicate the date or source volume, and bring it into the cluster family 280. For example, the family member 220(c) of family 280(2) pulls the outside data objects into the family 280(2) over network 110, 215. Family member 220(c) now has a consistent source and may be asked to maintain that source volume in cache (e.g., TVC 365) to make it readily available for peer replication.

In step 525, the source volume is cooperatively replicated among family members of the family. For example, a family group of clusters will cooperate by serializing the replication of any one volume when bringing it into the family for the first time. The clusters in a family may each play a role in replicating 1/Nth of the volumes where N is the number of clusters in the family requiring a copy.

By cooperatively replicating, the cluster family or DR location may become cumulatively consistent N times faster since any one volume was only pulled across the distant link once versus multiple times. The clusters can then become consistent among each other for availability much faster due to their relative distance between them. The overall time to become both DR consistent and HA (High availability) consistent may be greatly enhanced over each cluster independently sourcing from the same remote production cluster.

In step 530, the cluster family achieves cumulative consistency. That is, all volumes outside of the cluster family that need to be replicated into the cluster family are completed. The cluster family as a whole is consistent with respect to all outside data objects. Now, the cluster family members may share among each other so that each individual family member within the cluster family has its own copy.

In step 535, after all volumes are replicated into a family and the family is cumulatively consistent, the inconsistent clusters within the same family then share volumes (i.e., data objects) among each other.

Accordingly, implementing method 500 of the present invention performs cooperatively replication, in which the cluster family or DR location can become cumulatively consistent N times faster since any one volume was only pulled across the distant link once versus N times. The clusters may then become consistent among each other for availability much faster due to their relative distance between them. The overall time to become both DR consistent and HA consistent may then be greatly enhanced over each cluster independently sourcing from the same remote production cluster.

In addition, method 500 uses families for a more effective method of replicating to X clusters when only N copies are required by the customer and those N copies must be distant from each other. This allows a customer to spread copies across distances/families without being over explicit in which clusters receive a copy. For example, a user may not have a concern about which clusters contain the copy so long as N copies exist (where N is less than X); and, the customer demands that the N copies all exist in independent families. Therefore, all clusters in a domain may cooperate to make sure at least one member from each family replicates a volume and the remaining clusters may then surrender its replication requirements. It is possible then to end up with N copies in N families without having too many of the N copies in any one region.

The steps of method 500 may be employed in a mount processing in any combination thereof. For example, with cluster families configured in step 510, using steps 515-535, method 500 may favor clusters in its own family over clusters outside its family. For example, a mount to a production cluster may favor another production cluster (in the same family) over a remote cluster used primarily for disaster recovery (electronic vaulting). Since a user may tend to want production data to remain local and replicate quickly for high availability (favoring availability over disaster recoverability), sourcing a production cluster is much more effective in terms of the short term goal while still not affecting the long term goal.

Figure 6A:
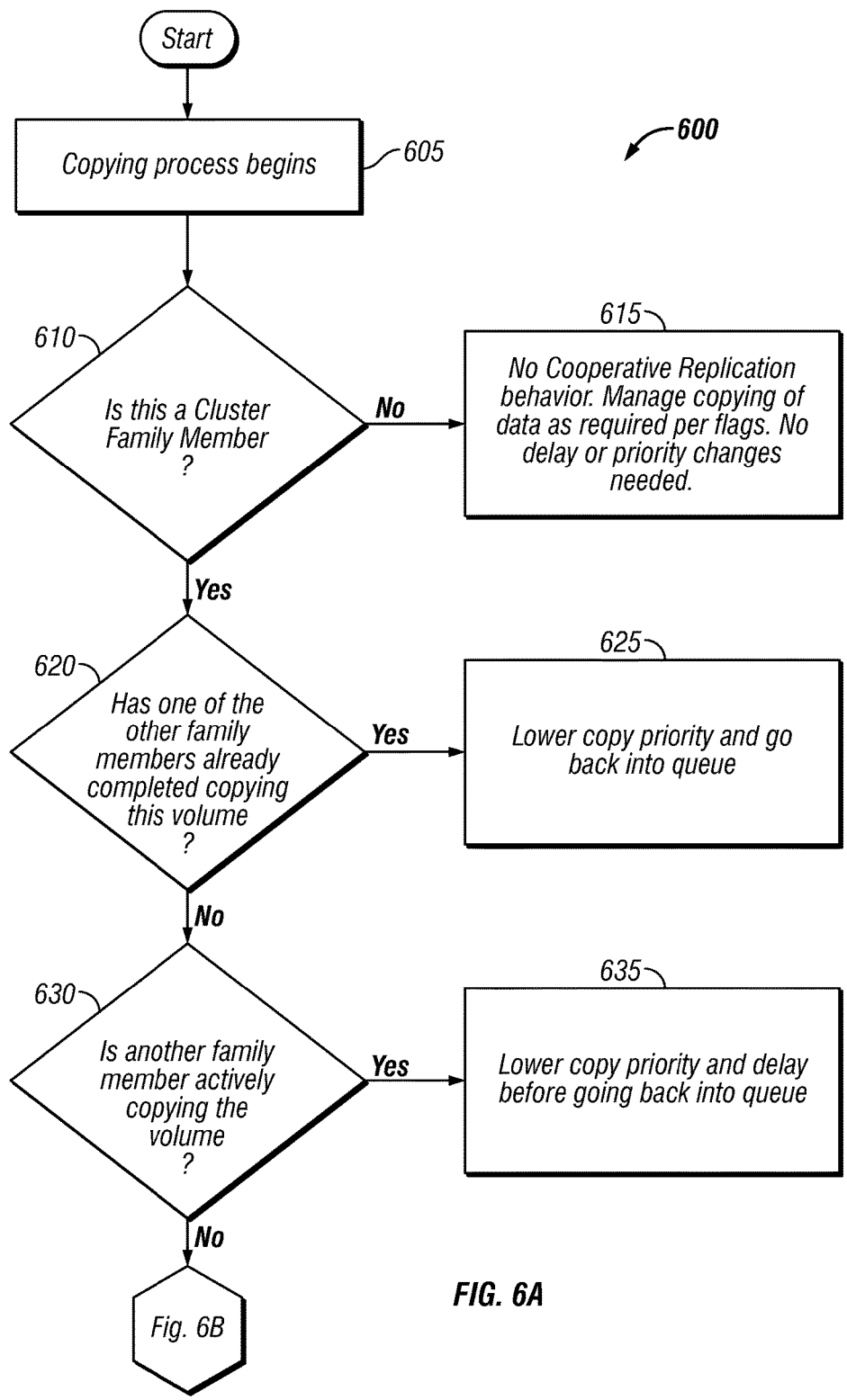
FIGS. 6A and 6B are schematic flow chart diagrams illustrating an embodiment of a cluster family selection and cooperative replication method of the present invention.
Figure 6B:
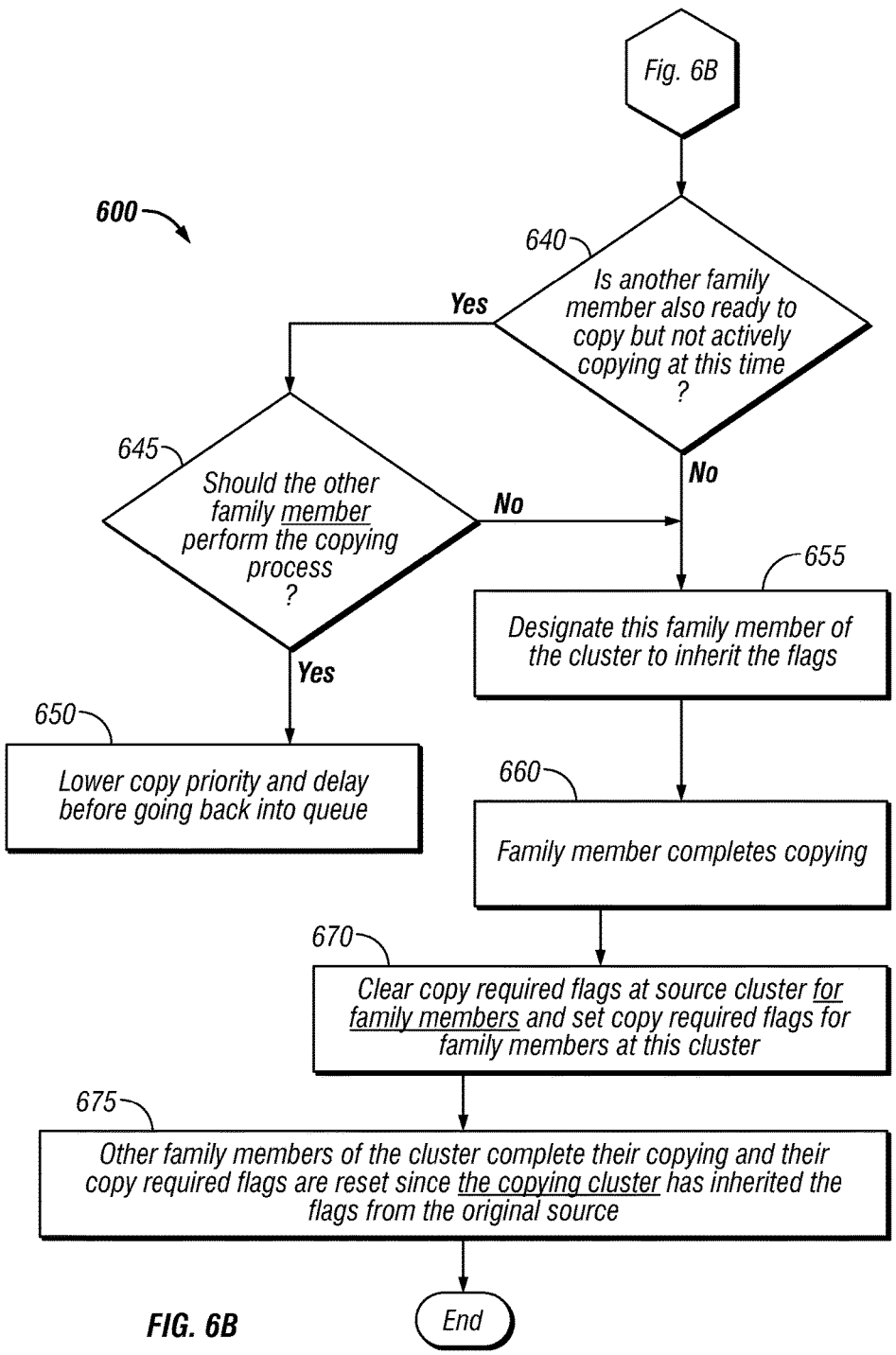

Referring to FIGS. 6A and 6B, are a schematic flow chart diagram illustrating an embodiment of a cluster family selection and cooperative replication method of the present invention. The method 600 substantially includes the steps to carry out the functions presented above with respect to the operation of the described apparatus and system of FIGS. 1-4. In an embodiment, the method is implemented with a computer program product comprising a computer readable medium having a computer readable program. The computer readable program may be integrated into a computing system, such as the cluster manager 320 and/or hosts 210, wherein the program in combination with the computing system is capable of performing the method 600.

The method 600 starts and in step 605, copying process begins. For example, outside data objects in City A needs to be replicate in City B (e.g., FIG. 2B).

In step 610, a control determines whether a cluster receiving the copy request is a cluster family member. If not, in step 615, the volume is copied without performing cooperative replication. For example, the cooperative replication module 415 may manage the copy request without delay or priority changes.

In addition, the cooperative replication module 415 may select at least one family member in the family to pull the data across a distant link or network. The selection may be performed once it is determined that the cluster is a family member and no other family members have pulled the data across the network.

If this is a cluster family member, in step 620, a control determines if one of the other family members has already completed copying this volume. If yes, in step 625, copying the volume is given a lower priority and placed back into the queue since one of the other family members has already copied the volume.

If one of the family members has not already completed copying to this volume, in step 630, a control determines if another family member is actively copying this volume. If yes, in step 635, the priority for copying this volume is lowered and there is a delay before going back into the queue. The delay before sending the copy request back into the queue is to ensure, for example, that another family member actively copying the volume has not encounter any problems copying the volume.

In step 630, if there is no other family member actively copying the volume, then in step 640, a control determines if another family member is also ready to copy this volume, but is not actively copying at this time. If no, in step 645, a control determines whether this other family member not actively copying at this time should inherit the copy required flags. If yes, in step 645, this cluster lowers copy priority and delays going back into queue.

If no in step 645, method 600 moves to step 655 and this family member wins the tiebreaker between the two cluster members and inherits the copy flags. Accordingly, in step 645, a control determines which family member will be designated to inherit the copy flags. The non-designated family member lowers copy priority and delays going back into queue (e.g., step 650).

Returning to step 640, if another family member is not ready to copy this volume, then in step 655, a control determines that in this cluster family there is only one family member ready to copy the volume and designates that family member as the cluster to inherit the copy flags and complete the replication.

It should be noted that in step 640, a control may determine there is another family ready to copy and not actively copying at this time, but as indicated in step 645, determine the other cluster will not inherit the copy flags. Accordingly, the cluster in step 640 would inherit the copy flags as illustrated in step 655.

In step 660, the designated cluster that inherited the copy flags in step 655, completes copying.

In step 670, a control clears the copy required flags at the source cluster and cooperates to cumulatively bring the family to consistency by setting copy required flags for family members of the cluster family.

In step 675, other family members of the cluster family complete their copying and their copy required flags set in step 655 within cluster designated to inherit the copy flags are reset.

FIGS. 1-3 may be illustrative of a multi-cluster configuration. In a multi-cluster configuration or (grid configuration), from a microcode perspective, each cluster may be unaware of its relationship and roles to itself and other clusters and thus, work equally independent of all other clusters. For example, when two or more clusters are configured globally-remote from one or more production clusters, they may replicate independently by 'pulling' data across the remote network. Because the clusters have no relationship awareness, they cannot operate in the most efficient way based on their role and/or distance from other clusters.

Additionally, in a multi-cluster configuration, the means of selecting a cluster to source a volume during mount processing and the ability for clusters to honor volume replication is greatly impacted by this unawareness to relationship. For example, the production cluster may choose a globally-remote source cluster over a metro-remote cluster for mount and/or copy processing. The globally-remote cluster is much less efficient due to the distance of the network between the clusters.

The implementations of the present invention may resolve these issues by bring relationship awareness among family members and families in a multi-cluster or gird configuration. Additionally, implementing the present invention may improve performance, efficiency, and optimization of the date copying and/or replication. For example, cooperatively replicating into a family in order to achieve cumulative family consistency N times faster as well as utilizing only 1/Nth of the cumulative network throughput may improves efficiencies and performance by reducing the overall time to become both DR consistent and HA consistent versus having each cluster independently sourcing from the same remote production cluster.

Referring to FIGS. 1-6, the implementations of the present invention may involve software, firmware, micro-code, hardware and/or any combination thereof. The implementations may take the form of code or logic implemented in a medium, such as memory, storage and/or circuitry of hierarchical storage node 315, where the medium may comprise hardware logic (e.g. an integrated circuit chip, Programmable Gate Array [PGA], Application Specific Integrated Circuit [ASIC], or other circuit, logic or device), or a computer readable storage medium, such as a magnetic storage medium (e.g. an electronic, magnetic, optical, electromagnetic, infrared, or semiconductor system, semiconductor or solid state memory, magnetic tape, a removable computer diskette, and random access memory [RAM], a read-only memory [ROM], a rigid magnetic disk and an optical disk, compact disk-read only memory [CD-ROM], compact disk-read/write [CD-R/W] and DVD).

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for cooperative replication of multiple clusters, the method comprising:
arranging at least one subset of the multiple clusters into family members of a cluster family;
negotiating between cluster family members to determine which cluster family member is in the best position to obtain at least one outside data object from an outside cluster, the outside cluster being apart from the cluster family;
selecting one family member of the cluster family to obtain the outside data object; and
sharing the outside data objects among the cluster family so that each cluster within the cluster family is consistent with respect to outside data objects;
wherein a first family member to replicate 1/Nth volumes informs the outside cluster that the first family member will maintain the volumes for the cluster family members and relieves the outside cluster from maintaining the volumes in a cache of the outside cluster.

2. The method of claim 1, further comprising creating a relationship among cluster families based on at least one of a cluster relationship and role.

3. The method of claim 1, wherein the family member with a consistent source maintains a volume in cache in order to make the volume readily available to other family members for peer replication.

4. The method of claim 3, wherein the family member maintaining the volume in cache for the other family members relieves the outside cluster from maintaining a copy in the outside cluster cache.

5. The method of claim 1, wherein each family member in the cluster family replicates 1/Nth volumes and N represents a total number of cluster family members in the cluster family.

6. The method of claim 1, further comprising a plurality of cluster families wherein at least one family member from each cluster family replicates a volume.

7. The method of claim 1, further comprising a domain comprising a plurality of clusters from the multiple clusters that cooperate to make sure at least one family member from each cluster family replicates a volume and remaining cluster family members from each cluster family surrender replication requirements.

8. A system for cooperative replication of multiple clusters, the system comprising:
a network;
a plurality of sites in communication over the network, each site comprising at least one host and a storage system comprising a plurality of clusters, each cluster comprising at least one tape drive configured to access volumes stored on magnetic tape, at least one tape volume cache, and a cluster manager configured to execute computer readable programs using a processor and a memory, wherein the computer readable programs:
arrange at least one subset of the multiple clusters into family members of a cluster family;
negotiate between cluster family members to determine which cluster family member is in the best position to obtain at least one outside data object an outside cluster, the outside cluster being apart the cluster family;
select one family member of the cluster family to obtain the outside data object; and
share the outside data objects among the cluster family so that each cluster within the cluster family is consistent with respect to outside data objects;
wherein a first family member to replicate 1/Nth volumes informs the outside cluster that the first family member will maintain the volumes for the cluster family members and relieves the outside cluster from maintaining the volumes in a cache of the outside cluster.

9. The system of claim 8, further comprising creating a relationship among cluster families based on at least one of a cluster relationship and role.

10. The system of claim 8, wherein the family member with a consistent source maintains a volume in cache in order to make the volume readily available to other family members for peer replication.

11. The system of claim 10, wherein the family member maintaining the volume in cache for the other family members relieves the outside cluster from maintaining a copy in the outside cluster cache.

12. The system of claim 8, wherein each family member in the cluster family replicates 1/Nth volumes and N represents a total number of cluster family members in the cluster family.

13. The system of claim 8, further comprising a plurality of cluster families wherein at least one family member from each family replicates a volume.

14. The system of claim 8, further comprising a domain comprising the plurality of clusters wherein the clusters cooperate to make sure at least one family member from each cluster family replicates a volume and remaining cluster family members from each cluster family surrender replication requirements.

15. A computer program product comprising a non-transitory computer readable medium including a computer readable program, wherein the computer readable program when executed on a computer causes the computer to:
    arrange at least one subset of the multiple clusters into family members of a cluster family;
    negotiate between cluster family members to determine which cluster family member is in the best position to obtain at least one outside data object from an outside cluster, the outside cluster being apart from the cluster family;
    select one family member of the cluster family to obtain the outside data object; and
    share the outside data objects among the cluster family so that each cluster within the cluster family is consistent with respect to outside data objects;
        wherein a first family member to replicate 1/Nth volumes informs the outside cluster that the first family member will maintain the volumes for the cluster family members and relieves the outside cluster from maintaining the volumes in a cache of the outside cluster.

16. The computer program product of claim 15, further comprising creating a relationship among cluster families based on at least one of a cluster relationship and role.

17. The computer program product of claim 15, wherein the family member with a consistent source maintains a volume in cache in order to make the volume readily available to other family members for peer replication.

18. The computer program product of claim 17, wherein each family member in the cluster family replicates 1/Nth volumes and N represents a total number of cluster family members in the cluster family.

* * * * *